United States Patent [19]
Pelton

[11] Patent Number: 5,036,469
[45] Date of Patent: Jul. 30, 1991

[54] PITCH ATTITUDE COMMAND FLIGHT CONTROL SYSTEM FOR LANDING FLARE

[75] Inventor: Scott L. Pelton, Renton, Wash.

[73] Assignee: The Boeing Company, Seattle, Wash.

[21] Appl. No.: 319,255

[22] Filed: Mar. 2, 1989

[51] Int. Cl.$^5$ .......................................... B64C 19/00
[52] U.S. Cl. .................................... 364/428; 364/433; 73/178 T; 244/181; 244/183
[58] Field of Search ........................ 364/428, 430, 433; 244/181, 183, 187, 196; 73/178 T

[56] References Cited

U.S. PATENT DOCUMENTS

| | | | |
|---|---|---|---|
| 3,887,148 | 6/1975 | Devlin | 364/429 |
| 3,892,373 | 7/1975 | Doniger | 364/429 |
| 4,006,871 | 2/1977 | Simpson | 364/428 |
| 4,419,732 | 12/1983 | Lambregts et al. | 364/430 |
| 4,534,000 | 8/1985 | Bliss | 364/428 |
| 4,607,201 | 8/1986 | Koenig | 244/181 |
| 4,633,404 | 12/1986 | Greeson et al. | 364/428 |

Primary Examiner—Gary Chin
Attorney, Agent, or Firm—Christensen, O'Connor, Johnson & Kindness

[57] ABSTRACT

This invention provides a flare control modification for pilot-in-the-loop aircraft maneuver command electronic flight control systems. During flare, pilot pitch control inputs are interpreted as incremental pitch attitude commands. The flare control modification allows conventional piloting technique (i.e., pitch controller pull-and-hold) to be used during flare, while retaining the benefits of maneuver command system masking effects of gusts, winds, wind shear, and variations in airplane weight, balance, and aerodynamic configuration.

14 Claims, 4 Drawing Sheets

PITCH ATTITUDE COMMAND FLIGHT CONTROL SYSTEM FOR LANDING FLARE

TECHNICAL AREA

This invention relates to aircraft maneuver command flight control systems and, more particularly, the landing mode of operation of aircraft maneuver command flight control systems.

BACKGROUND OF THE INVENTION

Until very recently, the primary flight control systems of commercial aircraft have utilized mechanical cables to transmit pilot-produced control inputs to the control surfaces of the aircraft. Pilot-produced inputs are created by a pilot moving various pitch, roll and yaw axis control devices, such as the column, wheel and rudder pedals located in front of the pilot (and copilot) seat(s) in an aircraft cockpit. The control surfaces of the aircraft include the elevators, ailerons, spoilers and rudder of the aircraft. In operation, a pilot manually "flies" an aircraft by moving various pitch, roll and yaw axis control devices so as to position the control surfaces in a way that makes the aircraft follow a desired flight path through space. Aircraft weight, center of gravity location, and aerodynamic configuration and location in a flight envelope determine how the pilot positions the pitch, roll and yaw axis control devices in order to follow a desired flight path. Changes in any of these factors may require that the position of the control devices be different, even when performing the same maneuver. Especially in adverse weather conditions (e.g., turbulence, wind shear, precipitation and poor visibility), pilot workload from manually operating pitch, roll and yaw axis control devices, plus navigation and other equipment, can become excessively high. Excessive pilot workload has the possibility of compromising safety, particularly during critical portions of a flight, such as approach, flare and landing.

Over the years, flight control system improvements, such as hydraulically powered control surfaces, "feel" systems, ratio changers and yaw dampers have helped to reduce pilot workload and to provide a more uniform aircraft response to given pilot control inputs when an aircraft is operating with different center of gravity locations and in different parts of its flight envelope. While these improvements have helped to reduce pilot workload under normal operating conditions, they have only partially solved the pilot workload problem in adverse weather conditions. The pilot workload problem in adverse weather conditions has been only partially solved because, even with these improvements, the basic way a pilot flies an airplane has remained unchanged—the pilot still commands control surface positions directly by positioning pitch, roll and yaw axis control devices.

The generation of commercial transport aircraft presently being developed will feature electronic flight control systems that are expected to provide a quantum reduction in pilot workload and a quantum improvement in flying qualities. Electronic flight control systems, such as fly-by-wire (FBW) and fly-by-light (FBL) flight control systems, will permit a pilot to command parameters other than control surface position with available control devices. For example, one system presently being considered for use on the next generation of Boeing aircraft allows a pilot to command pitch attitude rate-of-change through a pitch-axis control device. The pitch-axis control device is presently contemplated to be in the form of either a conventional control wheel column or a sidestick controller. Based on the pilot's positioning of the control device, the electronic flight control system will command the elevators of the aircraft to move in the manner required for the aircraft's actual pitch attitude rate-of-change to follow the pilot's commanded pitch attitude rate-of-change. In other words, a given input on the pitch axis control device will command a given rate-of-change of the pitch attitude of the aircraft. Returning the control device to a neutral position will zero the rate-of-change, not the pitch attitude. As a result, when the control device is placed in a neutral position, the aircraft will maintain the previously set pitch attitude. Changing from one pitch attitude to a different pitch attitude will require that a pilot move the control device to cause the pitch attitude to decrease (or increase) until the desired pitch attitude is achieved. That is, movement of the pitch axis control device will cause a pitch attitude change to occur that will ultimately result in the aircraft reaching level attitude (if this is the desired pitch attitude), at which time the control device will be moved to its neutral position. The magnitude of pitch axis control device movement will control the magnitude of the rate-of-change of pitch attitude.

The foregoing system reduces pilot workload because the electronic flight control system forces the aircraft to follow the pilot's pitch attitude rate-of-change commands regardless of aircraft inertia or aerodynamic configuration, location in the flight envelope, or the presence of external disturbances such as turbulence and wind shear. While a pitch attitude rate-of-change electronic flight control system is expected to considerably improve pitch-axis flying qualities during the takeoff, climb, cruise, and descent portions of a flight, the use of pitch attitude rate-of-change commands during the flare portion of a landing poses problems in two specific areas. First, in a conventional flare maneuver, a pilot pulls back on a control column and holds it back until the main wheels of the aircraft touch the runway, i.e., the aircraft lands. This action causes a pitch attitude change that is dependent on how far the stick is pulled back and held. In a pitch attitude rate-of-change electronic flight control system, a pitch attitude change is caused by applying a control pulse, not a steady pull and hold, to a pitch axis control device. This procedural difference requires pilot retraining and the additional expense associated with such retraining in order for a pitch attitude rate-of-change electronic flight control system of the type described above to be used during the flare portion of a landing. The second problem area relates to the risk of overflaring. The risk of overflaring is increased substantially using a pitch attitude rate-of-change electronic flight control system if a pilot does not return the pitch axis control device to its detent (i.e., neutral) position at the precise time the pitch attitude of the aircraft achieves the angle that produces a low sink-rate landing. If the pitch attitude changes, a pilot using a pitch attitude rate-of-change electronic flight control system is required to move the pitch axis control device to a position that creates the pitch attitude required to continue a low sink-rate landing. In summary, unconventional pilot maneuvering techniques during the flare portion of a landing are required with a pitch attitude rate-of-change electronic flight control system of the type described above.

One obvious way to avoid the foregoing problem is to deactivate the pitch attitude rate-of-change electronic flight control system during the flare portion of a landing. This approach has the disadvantage of losing all of the turbulence rejection, configuration masking and flight-envelope location masking effects normally provided by an electronic flight control system. Because flare is a high pilot workload portion of a flight, the loss of handling qualities and turbulence rejection benefits during landing flare is highly undesirable.

One proposed approach to avoiding the foregoing and other problems is to provide a flare control modification for pilot-in-the-loop aircraft maneuver command electronic flight control systems. During flare, pilot pitch control commands are interpreted as incremental flight path angle commands above a reference flight path angle, nominally a −3° glide slope. The flare control modification allows conventional piloting techniques (i.e., pitch controller pull-and-hold) to be used during flare while retaining the benefits of the maneuver command system masking effects of gusts, winds, wind shear, and variations in airplane weight, balance, and aerodynamic configuration. Such an approach is described in U.S. application Ser. No. 282,265, entitled "Flight Path Angle Command Flight Control System for Landing Flare" by Messrs. Sankrithi and Pelton, filed Dec. 8, 1988, and assigned to the assignee of the present invention. While such an approach solves the foregoing problems, it has two perceived disadvantages. Specifically, many pilots feel that their task changes from one of controlling flight path directly to one of controlling flight path indirectly by direct control of airplane attitude during landing flare. This "feeling" results from the fact that, as the ground approaches, pitch attitude cues become very intense as a pilot looks out the windows of an aircraft. Experienced pilots have learned to accurately land an aircraft using attitude cues and attitude controls. Thus, many pilots feel that a direct pitch attitude control system is more appropriate than a flight path angle control system during landing flare. A second perceived disadvantage of a flight path angle control system is associated with the fact that pilots use thrust control in combination with pitch control to obtain desired landing performance. In many scenarios using prior art (e.g., non-electronic) control systems, a pilot establishes a proper landing attitude with a given stick deflection followed by a reduction in throttle setting. This results in the aircraft "sinking" to touchdown. Sinking is accomplished at a nearly constant pitch attitude (and a nearly constant stick deflection). The dynamics of the situation involve an angle of attack increase and a corresponding flight path angle decrease (i.e., flight path angle becomes more negative) as speed bleeds off and pitch attitude is held nearly fixed. With an incremental flight path angle control system, as speed bleeds off with a fixed stick deflection, the flight path is maintained, and the airplane only slows down. Both attitude and angle of attack increase slightly. To increase sink rate, the pilot must relax stick force. The overall net effect of direct flight path angle control during flare is a tendency to "float". This results in a large percentage of touchdowns occurring beyond the desired touchdown spot.

The present invention is directed to avoiding the foregoing and other problems by providing a flare control modification for a maneuver command electronic flight control system that maintains the advantages of the system while allowing the pilot to use conventional piloting techniques during the flare portion of a landing. More specifically, the present invention is directed to providing a pitch axis command electronic flight control system for landing flare that reduces the risk of overflaring during the flare portion of a landing while retaining the turbulence rejection, configuration masking and location in the flight envelope masking benefits produced by closed-loop electronic flight control systems.

SUMMARY OF THE INVENTION

In accordance with this invention, a pitch attitude based flare control modification for a maneuver command electronic flight control system is provided. The flare control modification comprises providing a pitch attitude command control mode of operation during landing flare. When the landing flare pitch attitude command control mode of operation is working, the force applied by a pilot to the aircraft's pitch axis control device commands an incremental pitch attitude above a flare attitude reference determined when the landing flare pitch attitude command control mode becomes operational. During flight regimes other than landing flare (i.e., climb, cruise and descent), commonly referred to as up-and-away flight, normal operation of the maneuver command electronic flight control system occurs, where, typically, the force applied by the pilot to the pitch axis control device commands a pitch attitude rate-of-change, or some other parameter, depending upon the control law that forms the basis for the operation of the control system—gamma dot $\dot{\gamma}$ or C star (C), for examples. In either mode, i.e., the flare or incremental pitch attitude command mode, or the up-and-away or conventional command mode, the command signal is subtractively summed with a signal denoting the actual airplane pitch attitude and the resultant error signal used to control the position of the elevators of the aircraft. A major benefit of the flare control modification is that it permits conventional piloting techniques to be used during the flare portion of the landing without loss of the benefits of a maneuver command electronic flight control system, namely turbulence rejection, configuration effect masking, and location in the flight envelope effect masking. When contrasted with an incremental flight path angle command control system, the invention has the advantages of allowing a pilot to control pitch attitude rather than flight path angle during flare and use the aircraft's throttles to modulate sink rate consistent with flare maneuvers using conventional aircraft maneuver control systems.

BRIEF DESCRIPTION OF THE DRAWINGS

The foregoing and other features and advantages of this invention will become more readily appreciated as the same becomes better understood by reference to the following detailed description of preferred embodiments of the invention, when taken in conjunction with the accompanying drawings, wherein.

DESCRIPTION OF THE PREFERRED EMBODIMENTS

Figure 1:
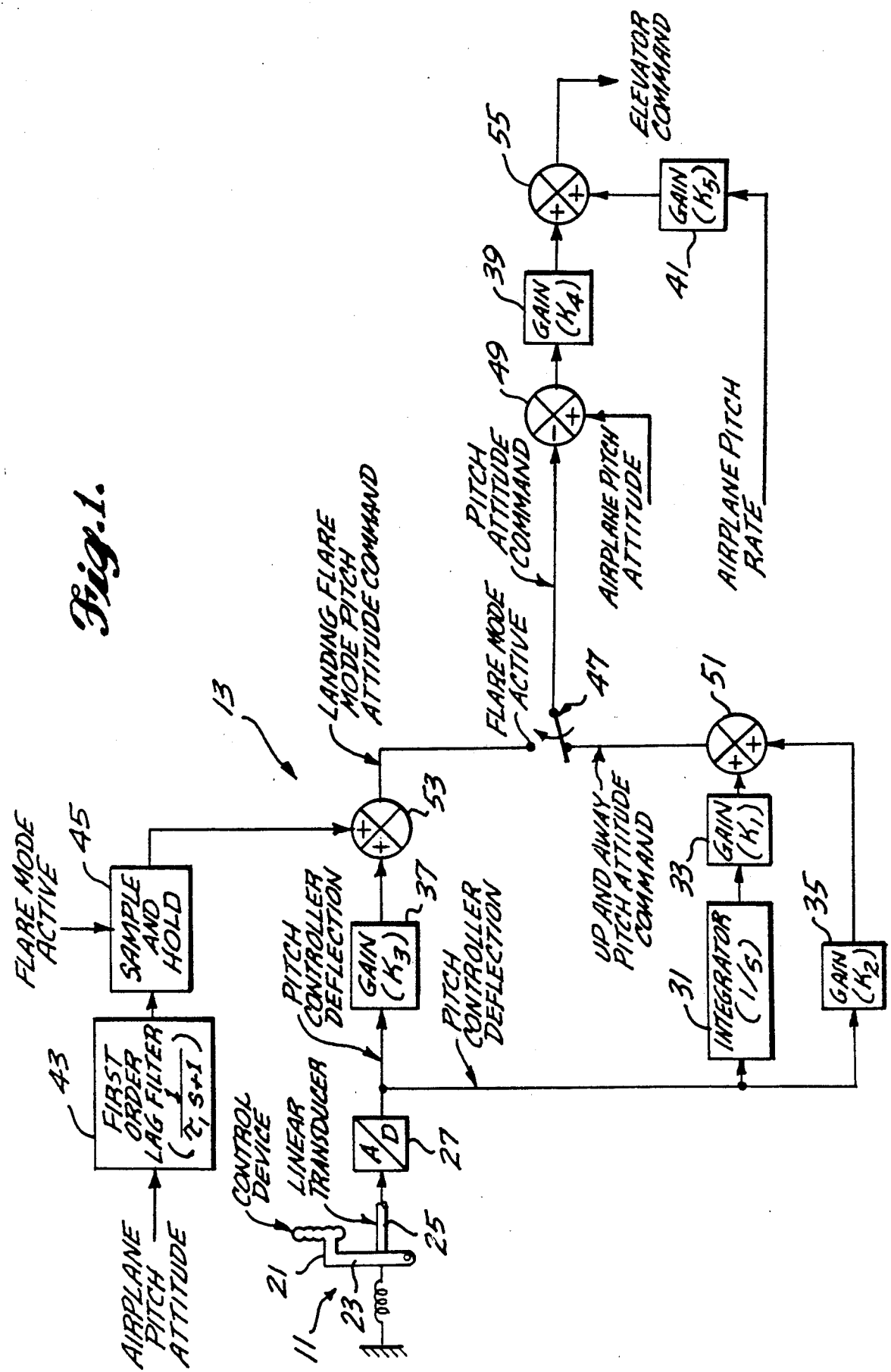
FIG. 1 is a functional block diagram of the pitch axis part of an electronic flight control system modified in accordance with the invention.
Figure 2:
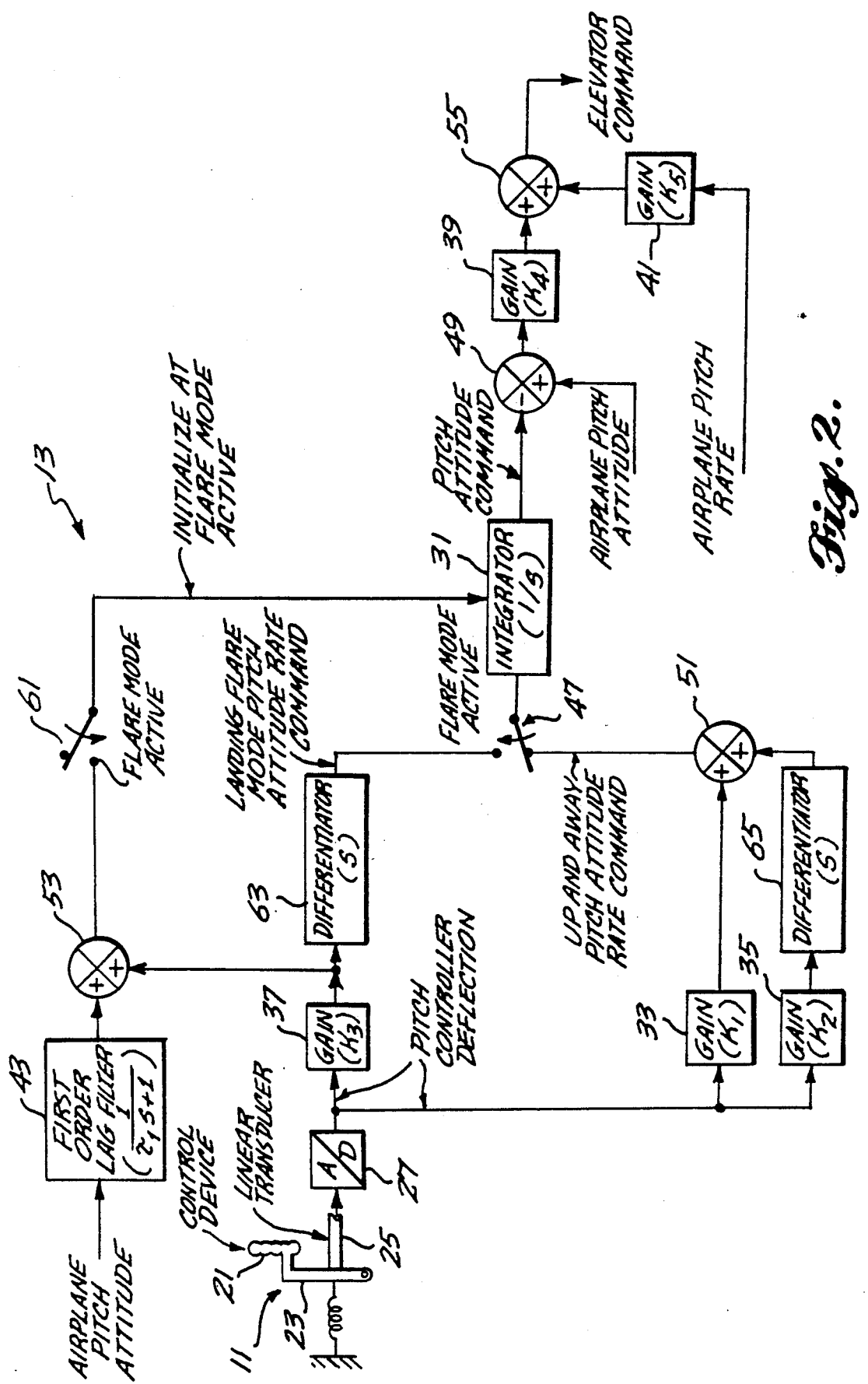
FIG. 2 is a functional block diagram of an alternative version of the pitch axis part of an electronic flight control system modified in accordance with the invention.
Figure 3:
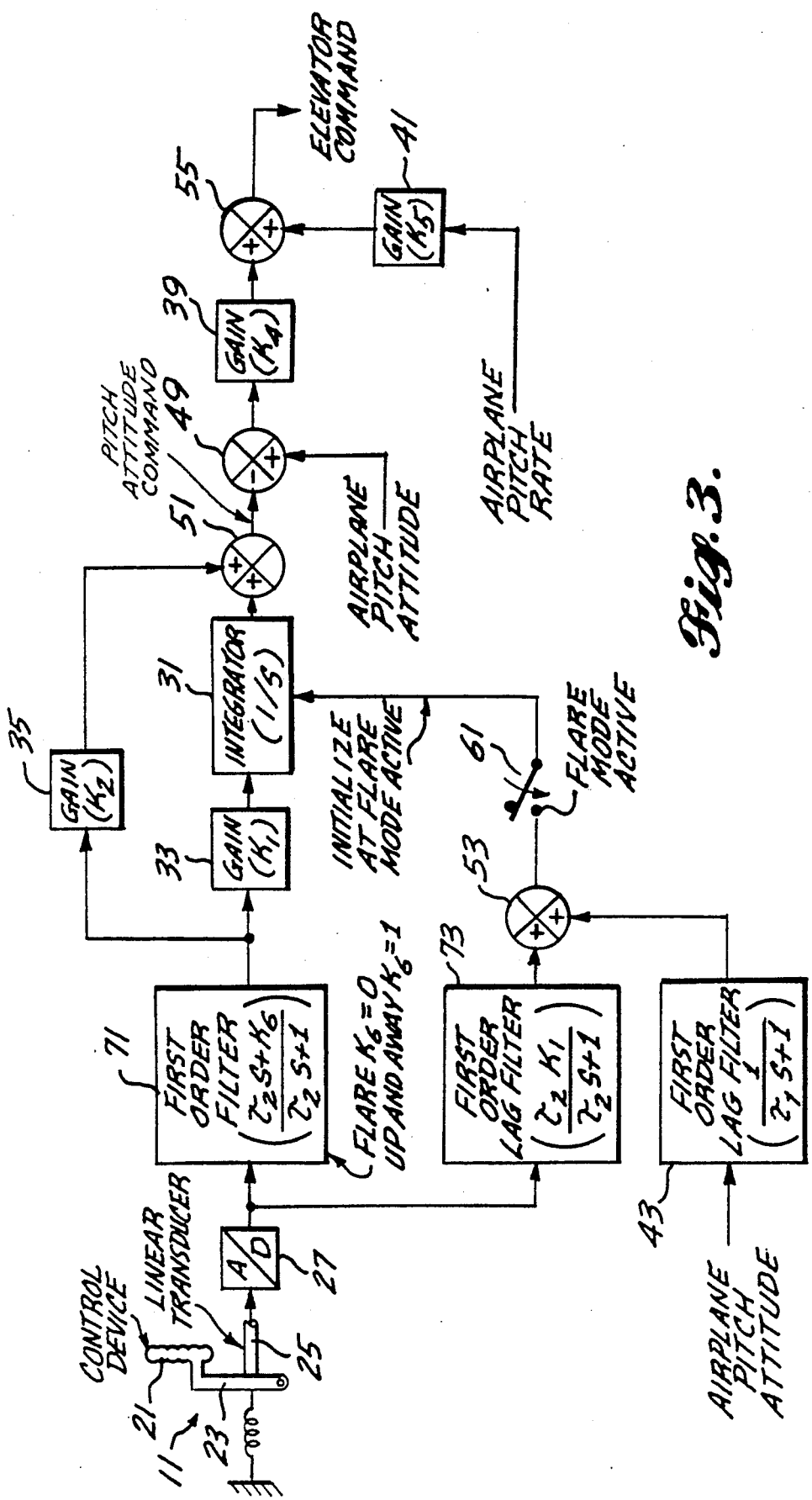
FIG. 3 is a functional block diagram of another alternative version of the pitch axis part of an electronic flight control system modified in accordance with this invention.

As will be better understood from the following description, the present invention modifies, during flare, an electronic flight control system that, for up-and-away flight, produces commands by integrating control signals that are representative of the deflection of a pilot-operated pitch axis control device. While the electronic flight control system for which the invention was initially developed, and the one described in this application, is based on a pitch attitude control law during up-and-away flight, the flare modification can be used with systems based on other control laws—gamma dot $\dot{\gamma}$ or C star ($\dot{C}$), for examples. The flare modification comprises eliminating the effect of the integration of the control signals that are representative of the deflection of the pilot-operated pitch axis control device and producing an incremental pitch attitude command, relative to a reference, directly from control signals that are representative of the deflection of the pilot-operated control device during the flare portion of a landing. Thus, rather than producing a pitch attitude command as a result of integrating a signal that is representative of the deflection of a pilot-operated control device, the invention produces an incremental pitch attitude command that is proportional to the signal that is representative of the deflection of the pilot-operated control device. The effect of the integration is eliminated during flare by either bypassing the integration function, or differentiating the signal that is representative of the deflection of the pilot-operated control device prior to the signal being integrated. Mathematically, the effect of differentiation, of course, counters the effect of the integration. FIG. 1 illustrates an embodiment of the invention wherein the effect of the integrator is eliminated by simply eliminating the integrator function during flare. FIG. 2 illustrates an embodiment of the invention wherein the effect of the integrator is eliminated by differentiating the signal that is representative of the deflection of the pilot-operated pitch axis control device prior to the signal being integrated. FIG. 3 illustrates an embodiment of the invention wherein the effect of the integrator is eliminated in the steady state response but contributes to the dynamics of the system during the initial portion of a maneuver in a manner similar to that designed into the up-and-away response. This effect is achieved by washing out the signal that is representative of the deflection of the pilot-operated pitch axis control device.

FIG. 1 includes: a pilot-operated pitch axis control device 11; and the pitch axis part of an electronic flight control system 13. The pilot-operated pitch axis control device 11 is pictorially illustrated as comprising a column and wheel controller 21. Centerstick, side stick, force-sensitive stick and other types of control devices can also be used by the invention. In the illustrated embodiment, a linear transducer 25 attached to the column 23 of the column and wheel controller 21 is oriented such that the position of the column controls the magnitude of an analog signal produced (or controlled) by the transducer 25. Obviously, other types of transducers can be used. For example, force transducers can be used. Or angular (rotary) transducers may be used rather than linear (displacement) transducers. Further, the analog signals produced by the chosen transducer can be in electric, optic, fluidic, or other form.

The analog signal produced (or controlled) by the transducer 25 is applied to the input of an analog-to-digital converter 27. The digital output of the analog-to-digital converter 27 is applied to the electronic flight control system 13 in the manner described below. As will be readily understood by those familiar with transducers, the analog signal producing transducer and the analog-to-digital converter can be replaced with a digital transducer.

While, for ease of description, the pitch axis part of the electronic flight control system 13 illustrated in FIG. 1 is shown in control law block form, and the blocks described as circuits, it is to be understood that the control law blocks can be implemented in integrated circuit form, discrete element circuit form, analog circuit form, or software form. Preferably, the functions of the control law blocks are implemented in a computer control program the overall purpose of which is to control the aerodynamic operation of an aircraft based on pilot or autopilot inputs in combination with a variety of sensor inputs. That is, preferably, the functions of the illustrated control law blocks form part of the primary flight control/flight management computer complex of an aircraft embodying this invention. The illustrated functional control law blocks include: an integrator 31; five gain circuits 33, 35, 37, 39 and 41, having gain values designated $K_1$, $K_2$, $K_3$, $K_4$ and $K_5$, respectively; a first order lag filter 43; a sample-and-hold circuit 45; a two-position switch 47; a subtractive summer 49; and three additive summers 51, 53 and 55.

The digital signal produced by the analog-to-digital converter 27 is applied to the input of the integrator 31 and to the inputs of the second and third gain circuits 35 and 37. The output of the integrator 31 is applied to the input of the first gain circuit 33 and the outputs of the first and second gain circuits are each applied to one of the inputs of the first additive summer 51. The output of the first additive summer 51, which is a signal designated UP AND AWAY PITCH ATTITUDE COMMAND, is applied to one of the remote terminals of the two-position switch 47.

An airplane pitch attitude signal produced by a sensor that senses the pitch attitude of the aircraft (not shown) is applied to the input of the first order lag filter 43, i.e., a filter having the Laplace transform:

$$1/\tau_1 s + 1 \qquad (1)$$

The output of the first order lag filter is applied to the sample input of the sample-and-hold circuit 45. When the flare mode becomes active, the control input of the sample-and-hold circuit is set to a hold state that causes the sample-and-hold circuit to store, i.e., hold, the output of the first order lag filter until the flare mode becomes inactive. During inactive periods, the sample-and-hold circuit tracks, i.e., samples, the output of the first order lag filter. The outputs of the third gain circuit 37 and the sample-and-hold circuit are each applied to one input of the second additive summer 53. The output of the second additive summer, which is a signal denoted LANDING FLARE MODE PITCH ATTITUDE COMMAND, is applied to the other remote terminal of the two-position switch 47.

The common terminal of the two-position switch is connected to the negative input of the subtractive summer 49. A signal produced by an airplane pitch attitude sensor (not shown) is applied to the positive input of the subtractive summer 49. The output of the subtractive summer 49 is applied through the fourth gain circuit 39 to one input of the third additive summer 55. A signal produced by an airplane pitch rate-of-change sensor (not shown) is applied through the fifth gain circuit 41 to the other input of the third additive summer 55. The output of the third additive summer 55 is an elevator command signal that is applied through a suitable actuator to the elevators of the aircraft. (As will be readily appreciated by those skilled in the aircraft control system art, the elevator command signal may be modified by signals produced by other sensors and systems prior to being applied to the elevator actuator.)

As will be readily appreciated from the foregoing description and viewing FIG. 1, the state of the two-position switch 47 determines the mode of operation of the pitch attitude command flight control system illustrated in FIG. 1. The state of the two-position switch is determined by the location of the airplane along its flight path. During up-and-away flight, the common terminal of the two-position switch 47 is connected to the remote terminal connected to the output of the first additive summer 51. During flare, which commences at an elevation of approximately fifty feet above a runway just prior to touchdown, the common terminal of the two-position switch is connected to the remote terminal connected to the output of the second additive summer 53. When in the up-and-away position, signals produced by the analog-to-digital converter 27 in response to pilot movement of the controller 21 are integrated by the integrator 31 and amplified by the first gain circuit 33. Simultaneously, the signals are amplified by the second gain circuit 35. The signal path created by the second gain circuit is a quickening path that causes an immediate elevator command change that compensates for the relatively slow response of the integration signal path. The end result is an UP-AND-AWAY PITCH ATTITUDE COMMAND signal. This signal is subtractively summed with the signal produced by the pitch attitude sensor of the aircraft in the subtractive summer 49. The resultant error signal is amplified by the fourth gain circuit 39. The resulting error signal is combined with a pitch rate damping signal produced by amplifying the output of the aircraft's pitch rate sensor. The result is the ELEVATOR COMMAND signal.

When the two-position switch 47 is in its flare mode active position, the integrator 31 and the first gain circuit 33 are, in effect, bypassed. In this mode, the pitch controller deflection creates a LANDING FLARE MODE PITCH ATTITUDE COMMAND signal. Preferably, the position of the two-position switch is changed automatically when the aircraft descends during an approach to a particular altitude, such as fifty feet (50') above the runway. A suitable switch position control signal can be produced by the airplane's radio altimeter when the desired altitude is reached.

Simultaneously with the change in position of the two-position switch, the sample-and-hold circuit is commanded to store, i.e., hold, the output of the first order lag filter. The output of the first order lag filter is an estimate of the trim pitch attitude of the aircraft. Adding this signal to the output of the third gain circuit 37 assures that incremental changes of aircraft pitch attitude, relative to trim pitch attitude, will result when the pitch axis control device is moved. When the pitch axis control device is in its detent position, the estimated trim pitch attitude value is commanded. The third gain circuit controls the sensitivity of the system, i.e., controls the magnitude of the deflection change, required to create a predetermined amount of elevator change during flare. As with the up-and-away mode of operation, in the flare mode of operation, the signal produced at the common terminal of the two-position switch 47 is subtractively summed in the subtractive summer 49 with a signal that denotes the actual pitch attitude of the aircraft. The resultant error signal is amplified by the fourth gain circuit 39 and added to the aircraft pitch rate signal amplified by the fifth gain circuit 41.

Figure 4:
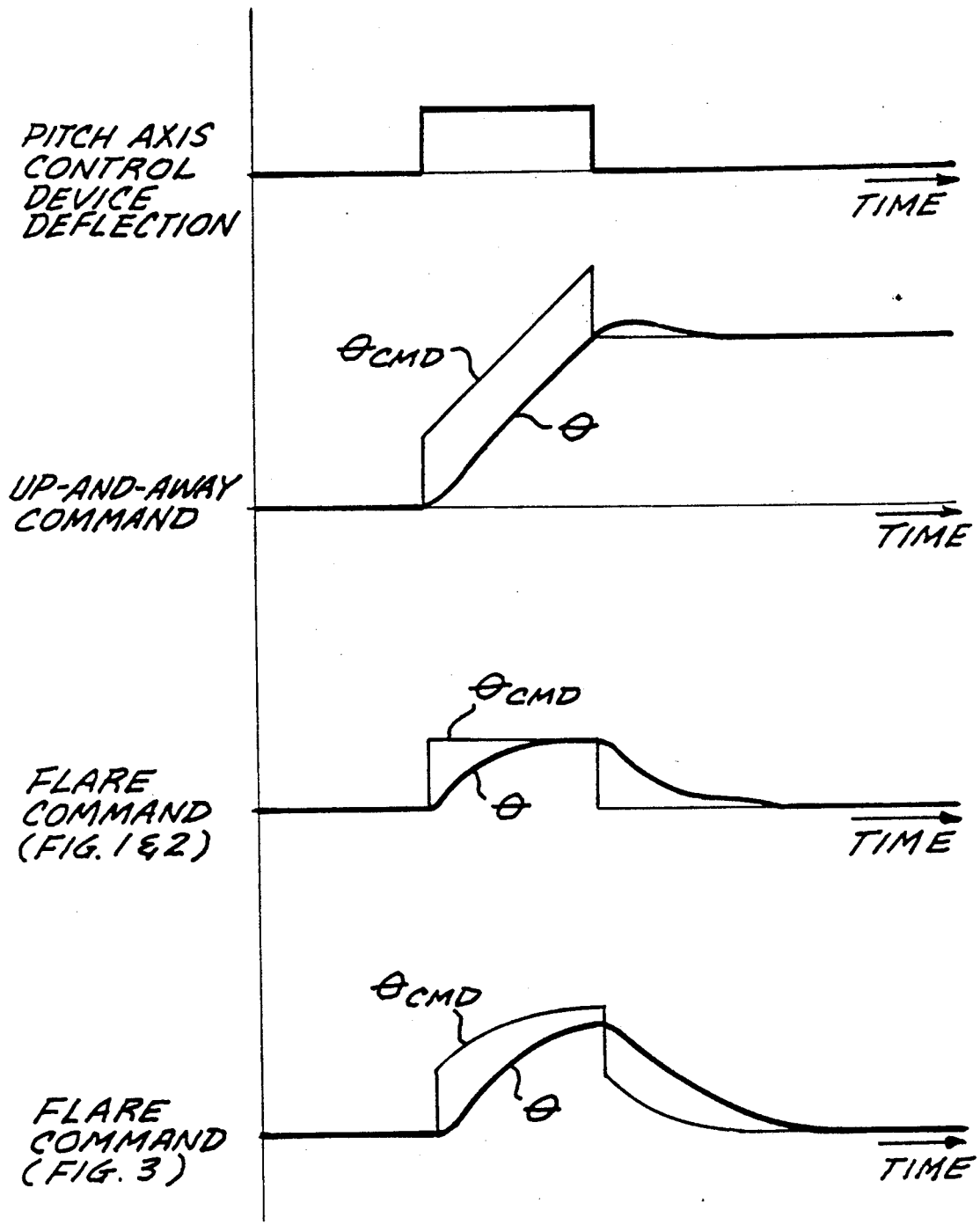
FIG. 4 is a series of time history lines used to describe the operation of an electronic flight control system modified in accordance with this invention.

As will be readily appreciated by those skilled in the airplane control system art and others, the presence or absence of the integrator 31 in the circuit between the output of the analog-to-digital converter 27 and the common terminal of the two-position switch 39 determines the effect of movement of the pilot-operated control device 21. When the integrator 31 is in the circuit, which occurs during up-and-away operation, the control device creates a rate signal that is converted to a PITCH ATTITUDE COMMAND signal by the integrator 31. Because the integrator 31 is not present in the circuit during flare, movement of the control device 21 directly creates a PITCH ATTITUDE COMMAND signal. FIG. 4 illustrates the difference in pitch attitude command responses to the same control device movement during up-and-away operation on the one hand and flare on the other hand. It is this difference that allows a pilot to operate the aircraft in a manner that takes advantage of an electronic flight control system during normal flight while allowing conventional piloting techniques to be used during the flare portion of a landing. As a result, the benefits of an electronic flight control system available during up-and-away operation is also available during flare operation.

While the embodiment of the invention illustrated in FIG. 1 eliminates the flare problem, discussed above, that occurs in electronic flight control systems that normally control the attitude of an aircraft by integrating pitch attitude rate command signals that are proportional to the position of a pilot-operated pitch axis control device and, thus, is a substantial improvement over the prior art, it has certain disadvantages. The primary disadvantage is that the transition from an approach mode of operation to a flare mode of operation is relatively abrupt. The embodiment of the invention illustrated in FIG. 2 avoids this problem by retaining the integrator 31 in the circuit during flare and compensating for its effect by differentiating the pitch command signal produced by the analog-to-digital converter 27 prior to the signal being integrated.

Since the FIG. 2 embodiment of the invention is, in many respects, similar to the FIG. 1 embodiment, only the differences between the two embodiments of the invention are described. In this way, unnecessary duplication of descriptive material is avoided.

In the embodiment of the invention illustrated in FIG. 2, the sample-and-hold circuit is eliminated and the output of the first order lag filter is applied directly to an input of the second additive summer 53. Rather than being applied to the two-position switch 47, the output of the second additive summer 53 is applied through an open/closed switch 61 to an initializing input of the integrator 31. (The initializing input presets the integrator to a preset value when the open/closed switch is closed.) The output of the third gain circuit 37 is applied through a differentiator 63 to one of the remote inputs of the two-position switch 47. Rather than being connected to the input of the integrator, the output of the first gain circuit 33 is connected to one input of the first additive summer 51. Rather than being connected to an input of the first additive summer, the output of the second gain circuit 35 is applied to the input of a second differentiator 65, and the output of the second differentiator is applied to an input of the first additive summer 51. The output of the first additive summer 51 is applied to the other remote terminal of the two-position switch and the common terminal of the two-position switch is connected to the signal input of the integrator 31. The output of the integrator 31 is applied to the negative input of the subtractive summer 49.

When the two-position switch 47 of the embodiment of the invention illustrated in FIG. 2 is in the up-and-away position, the system illustrated in FIG. 2 is, functionally, identical to the system illustrated in FIG. 1 when the two-position switch 47 is in the up-and-away position. The only difference between the two systems is that the two-position switch 47 in the FIG. 1 embodiment of the invention is located downstream of the integrator 31. In the FIG. 2 embodiment of the invention, the two-position switch 47 is located upstream of the integrator 31. In either case, the signal produced by the analog-to-digital converter 27 is integrated by the integrator 31 prior to being applied to the negative input of the subtractive summer 49. Since the second differentiator 65 mathematically cancels the effect of the integrator 31, the parallel paths through the second gain circuit 35 are also functionally the same.

The difference between the FIG. 1 and FIG. 2 embodiments of the invention occurs when the two-position switch 47 is in the flare mode active position. As described above, when the two-position switch 47 is in the flare mode active position, the integrator 31 is bypassed in the embodiment of the invention illustrated in FIG. 1. In the embodiment of the invention illustrated in FIG. 2, when the two-position switch is in the flare mode active position, the first differentiator 63 is connected in series with the integrator 31. As a result, rather than bypassing the integrator, the effect of the integrator is mathematically nullified by the first differentiator. While the first differentiator 63 mathematically offsets or negates the effect of the integrator 31, the synchronization benefits of the integrator are retained. More specifically, as will be readily understood by those skilled in the control system art, when a differentiator and an integrator are serially combined, the function of one cancels the function of the other. While the functions are canceled, synchronization benefits are retained because multiple path command signals are switched upstream of the integrator. Because these benefits are retained, the transition between the approach mode of operation and the flare mode of operation of the embodiment of the invention illustrated in FIG. 2 is smoother than in the embodiment of the invention illustrated in FIG. 1. Transition smoothness is further enhanced by initializing the integrator in the manner illustrated in FIG. 2 and described above by closing the open/closed switch 61 at the same time that the two-position switch 47 is switched to the flare mode active position. The integrator initialization is typically performed by linearly changing the value of the integrator to the required value over a short time period—one or two seconds, for example.

The initialization of the integrator has another benefit—it makes a consistent and predictable amount of control device deflection create a consistent and predictable amount of pitch attitude change. Predictability of pitch attitude change is important because flare occurs during a landing when a pilot changes pitch attitude in a manner that raises the nose of the aircraft. If the integrator is not initialized, a large and, thus, abnormal, variation in stick deflection may be required during flare in order to achieve the attitude change needed for a smooth touchdown. This occurs if the reference (i.e., stick in detent position) pitch attitude command value held by the integrator is abnormal due to pilot maneuvering at the instant the flare mode becomes active.

In accordance with the invention, if the pitch axis control device 11 is in its detent position, when the position of the two-position switch 47 is changed to the flare mode active position, and the open/closed switch 61 is closed, the integrator 31 is initialized to the trim value of pitch attitude for the current flight condition and airplane configuration. This is accomplished by passing the airplane pitch attitude signal through the first order lag filter 43, which has a relatively large time constant (e.g., 25 seconds). The effect of the long time constant first order lag filter is to eliminate any short-term changes in pitch attitude trim due to turbulence and/or minor maneuvering.

If the pitch axis control device is not in its detent position when the flare mode becomes active, the integrator 31 is initialized to a value such that when the pitch axis control device is moved to its detent position, the pitch attitude command will be at the trim value of pitch attitude for the current flight condition and airplane configuration. In this way, a constant deflection of the pitch axis control device 11 is always required in order to create a given incremental pitch attitude change relative to a trim value. If the integrator is initialized to the trim pitch attitude value when the pitch axis control device is not in its detent position, the nondetent position becomes the "neutral" position rather than the detent position being the neutral position about which incremental pitch attitude values (relative to trim) are commanded. Initializing for the out-of-detent position of the pitch axis control device 11 is accomplished as shown in FIG. 2 by summing the trim pitch attitude value with a value that is proportional to pitch axis control device deflection that accounts for how much the control device is away from its detent position when flare commences. This value is the output of the third gain circuit 37.

FIG. 3 illustrates an embodiment of the invention that, in many ways, is similar to the FIG. 2 embodiment of the invention. The primary difference is that the two-position switch 47 is eliminated and both the flare and the up-and-away control paths identically feed into a first order filter 71 having the following Laplace transform:

$$\frac{\tau_2 s + K_6}{\tau_2 s + 1} \qquad (2)$$

where $K_6$ is dependent on the position of the aircraft along its flight path. During nonflare (i.e., up-and-away) flight, $K_6$ equals one (1) and during flare $K_6$ equals zero (0). Like the changing of the position of the two-position switch 47 and the closure of the open/closed switch 61, preferably, the value of $K_6$ is controlled by a radio altimeter signal that changes state when the aircraft descends to the altitude where flare is to commence.

More specifically, in the FIG. 3 embodiment of the invention, the output of the analog-to-digital converter 27 is connected to the input of the first order filter 71 and the output of the first order filter is connected to a parallel network, one leg formed by the integrator 31 and the first gain circuit 33 connected in series, and the other leg formed by the second gain circuit. The outputs of the two legs are summed by the first additive summer 51 and the output of the first additive summer is connected to the negative input of the subtractive summer 49.

The output of a first order lag filter 43, having a Laplace transform identical to the first order lag filters contained in the embodiments of the invention illustrated in FIGS. 1 and 2 and described above, is summed in the FIG. 3 embodiment with the output of a second first order lag filter 73. The second first order lag filter 73 has the Laplace transform:

$$\frac{\tau_2 K_1}{\tau_2 s + 1} \qquad (3)$$

(Note that the time constant, $\tau_2$, of Equation (3) is identical to the time constant, $\tau_2$, of Equation (2)).

The output of the analog-to-digital converter is applied to the input of the second first order lag filter 73 and the outputs of the first order lag filters are summed in the first additive summer 53. As in the FIG. 2 embodiment of the invention, the output of the second additive summer is applied through the open/closed switch 61 to an initialization input of the integrator 31. The open/closed switch is closed when the flare mode becomes active. Otherwise, the open/closed switch is open.

Since $K_6$ equals one (1) and the open/closed switch 61 is open for all flight regimes other than flare, the FIG. 3 embodiment of the invention is identical to and operates the same as the embodiments of the invention illustrated in FIGS. 1 and 2 when the two-position switch is in its up-and-away position. More specifically, when $K_6$ equals one (1), the first order filter 71 has no effect on the signal produced by the analog-to-digital converter 27. This result occurs because the numerator and denominator of the first order filter Laplace transform cancel when $K_6$ equals one (1). During flare, the first order filter 71 is a washout term that cancels the effect of the integrator 31 when a steady state is achieved, which occurs after a time period corresponding to several time constants. The net result is that high frequency input components pass through the filter 71 in the same way they pass in the up-and-away mode, while steady input components are attenuated. This causes the pitch attitude command signal to approach a steady state value when a pull-and-hold maneuver typical of flare occurs. See FIG. 4. At the start of flare, the first order filter 71 functions to create a smooth transition between the approach and flare mode of operation of an electronic flight control system incorporating this invention. In essence, the FIG. 3 embodiment of the invention creates a differentiator-like effect by changing a type zero (0) filter to a type negative one ($-1$) filter. The same result, with an even smoother transition, can be accomplished by using a second or higher order filter configured such that the last term of the numerator is zero (0) during flare and equals the last term of the denominator during other flight regimes.

As with the embodiment of the invention illustrated in FIG. 2, the integrator initialization part of the network of the embodiment of the invention illustrated in FIG. 3 initializes the integrator to an appropriate value when flare commences. The second first order lag filter is provided to account for the effect of any stick deflection that exists at the instant the transition to flare occurs. The dynamic response of the second first order lag filter 73 is identical to the dynamic response of the command path formed by the first order filter 71, the first gain circuit 33 and the integrator 31. As a result, the integrator is initialized to a value such that when the pitch axis control device is moved to its detent position, the pitch attitude command value will be set to the estimated trim pitch attitude value, as determined by the output of the first order lag filter 43. As in the embodiment of the invention illustrated in FIG. 2, the initialization of the integrator 31 should be linearly changing the starting integrator value to the initialization value over a short time period —one or two seconds, for example.

The embodiment of the invention illustrated in FIG. 3 has the additional benefit that the transition from the flare mode back to the up-and-away mode, which typically, when a go-around or missed approach occurs, is dynamically very smooth. This result occurs because the past value of the first order filter 21 is not reset when the transition occurs. Thus, a steady (i.e., pull-and-hold) pitch axis control device input slowly transitions from commanding an incremental pitch attitude value to commanding a pitch attitude rate-of-change value when a go-around occurs. As a result, this embodiment of the invention does not require a pilot to immediately release the pitch axis control device so that it can move to a detent position when a transition from flare to up-and-away occurs during a go-around in order to prevent over-rotation. Rather, pitch axis control device release at the time of the transition can be accomplished in a smooth, natural manner. Contrariwise, the embodiments of the invention illustrated in FIGS. 1 and 2 require the immediate release of the pitch axis control device if over-rotation is to be prevented during a go-around.

While the specific values of the various gain and filter terms will depend upon the specific application of embodiments of the invention, representative values are set forth in the following table.

| TERM | VALUE(S) |
| --- | --- |
| $K_1$ | 300/$V_T$ (where $V_T$ = true airspeed in feet per second) |
| $K_2$ | 260/$V_T$ (where $V_T$ = true airspeed in feet per second) |
| $K_3$ | 260/$V_T$ (where $V_T$ = true airspeed in feet per second) |
| $K_4$ | 150/$Q_C$ (where $Q_C$ is impact pressure in pounds per square foot) |
| $K_5$ | 150/$Q_C$ (where $Q_C$ is impact pressure in pounds per square foot) |
| $\tau_1$ | 25.0 |
| $\tau_2$ | 1.0 |

As will be readily appreciated by those skilled in this art and others from the foregoing description, the invention provides a flare control modification for a maneuver command pitch axis flight control system that normally controls the attitude of an aircraft by integrating pitch attitude rate command signals that are proportional to the position of a pilot-operated pitch axis control device. In essence, the modification comprises eliminating the effect of the integrator during flare. The effect of the integrator is canceled by either eliminating the integrator function entirely during flare or by compensating for integration by differentiating the signal that is proportional to the position of the pilot-operated pitch axis control device. Although various preferred embodiments of the invention have been illustrated and described, it is to be understood that the invention is not limited to these embodiments. Thus, it is to be understood that within the scope of the appended claims, various changes can be made in the specifically disclosed embodiments of the invention. For example, depending upon signal level and other relevant factors, one or more of the various gain circuits can be eliminated.

The embodiments of the invention in which an exclusive property or privilege is claimed are defined as follows:

1. In an aircraft maneuver command electronic flight control system wherein during up-and-away flight a continuing pitch axis control signal is produced by a continuing steady input applied to a pilot-operated pitch axis control device, the improvement comprising a flare mode modification that becomes active during the flare portion of a landing, said flare mode modification including command modification means responsively connected to said pilot-operated pitch axis control device for receiving said pitch axis control signal and producing an incremental pitch axis command relative to the pitch attitude of the aircraft at the start of flare based on the continuing steady input applied to said pilot-operated pitch axis control device.

2. The improvement claimed in claim 1, wherein:
   (a) said maneuver command electronic flight control system includes an integrator that integrates said pitch axis control signal;
   (b) said command modification means includes integration cancellation means for cancelling the effect of integrating said pitch axis control signal by bypassing said integrator.

3. The improvement claimed in claim 1, wherein:
   (a) said maneuver command electronic flight control system includes an integrator that integrates said pitch axis control signal; and,
   (b) said command modification means includes integration cancellation means comprising a differentiator connected in series with said integrator for cancelling the effect of integrating said pitch axis control signal.

4. The improvement claimed in claim 3, wherein, signalwise, said differentiator is upstream of said integrator.

5. The improvement claimed in claim 4, wherein said integrator is set to a predetermined value when the flare portion of a landing maneuver begins.

6. The improvement claimed in claims 3, 4, or 5, wherein said differentiator is formed by changing a type zero (0) filter to a type negative one (−1) filter when the flare portion of a landing maneuver begins.

7. The improvement claimed in claim 6, wherein said filter is a first order filter.

8. The improvement claimed in claim 6, wherein said type zero (0) filter has a simple unity gain.

9. A method of controlling, during the flare portion of a landing maneuver, the pitch axis movement of an aircraft controlled by an aircraft maneuver command electronic flight control system, said method comprising the steps of:
   determining the height of the aircraft above the ground during said landing maneuver; and
   controlling the value of an incremental pitch axis command relative to a reference value in response to the deflection of a pilot-operated pitch axis control device when the aircraft descends below a predetermined altitude above the ground during said landing maneuver, said reference value determined by the pitch attitude of the aircraft when the aircraft descends below said predetermined altitude above the ground during said landing maneuver, said incremental pitch axis command controlling the pitch axis movement of the aircraft controlled by said aircraft maneuver command electronic flight control system.

10. The method claimed in claim 9, wherein pitch axis movement of said aircraft during up-and-away flight is controlled by integrating pitch axis commands that are representative of the deflection of said pilot-operated pitch axis control device and wherein said step of controlling the value of an incremental pitch axis command relative to a reference value is created by not integrating said pitch axis commands that are representative of the deflection of said pilot-operated pitch axis control device.

11. The method claimed in claim 9, wherein pitch axis movement of said aircraft during up-and-away flight is controlled by integrating pitch axis commands that are representative of the deflection of said pilot-operated control device and wherein said step of controlling the value of an incremental pitch axis command relative to a reference value is created by differentiating said pitch axis commands that are representative of the deflection of said pilot-operated pitch axis control device.

12. The method claimed in claim 11, wherein said pitch axis commands that are representative of the deflection of said pilot-operated pitch axis control device are differentiated prior to said pitch axis commands being integrated.

13. The method claimed in claim 12, wherein said pitch axis commands that are representative of the deflection of said pilot-operated pitch axis control device are filtered as well as differentiated.

14. The method claimed in claim 13, wherein said pitch axis commands that are representative of the deflection of said pilot-operated control device are filtered by a first order filter.

* * * * *

UNITED STATES PATENT AND TRADEMARK OFFICE
CERTIFICATE OF CORRECTION

PATENT NO. : 5,036,469

DATED : July 30, 1991

INVENTOR(S) : S.L. Pelton

It is certified that error appears in the above-identified patent and that said Letters Patent is hereby corrected as shown below:

| COLUMN | LINES | |
|---|---|---|
| 6 | 51-53 | "$1/\tau_1 s + 1$" should read $\dfrac{1}{\tau_1 s + 1}$ |

Signed and Sealed this

Sixteenth Day of March, 1993

Attest:

STEPHEN G. KUNIN

*Attesting Officer*  *Acting Commissioner of Patents and Trademarks*